US009395224B2

(12) United States Patent
Rao et al.

(10) Patent No.: US 9,395,224 B2
(45) Date of Patent: Jul. 19, 2016

(54) CORIOLIS FLOWMETER AND METHOD WITH IMPROVED METER ZERO

(75) Inventors: Manoj Rao, Indore (IN); Anand Vidhate, Pune (IN); Timothy J. Cunningham, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 14/417,873

(22) PCT Filed: Aug. 21, 2012

(86) PCT No.: PCT/US2012/051714
§ 371 (c)(1),
(2), (4) Date: Jan. 28, 2015

(87) PCT Pub. No.: WO2014/031103
PCT Pub. Date: Feb. 27, 2014

(65) Prior Publication Data
US 2015/0253171 A1    Sep. 10, 2015

(51) Int. Cl.
*G01F 1/84*    (2006.01)
(52) U.S. Cl.
CPC ............. *G01F 1/84* (2013.01); *G01F 1/8427* (2013.01); *G01F 1/8472* (2013.01)
(58) Field of Classification Search
CPC ........................................................ G01F 1/84
USPC ..................................... 73/861.355–861.357
See application file for complete search history.

(56) References Cited

U.S. PATENT DOCUMENTS

| 4,823,613 | A | 4/1989 | Cage et al. |
|---|---|---|---|
| 5,301,557 | A | 4/1994 | Cage et al. |
| 5,497,666 | A | 3/1996 | Patten et al. |
| 6,092,429 | A | 7/2000 | Cunningham et al. |
| 7,597,007 | B2 | 10/2009 | Van Cleve et al. |
| 8,113,064 | B2 | 2/2012 | Huber et al. |
| 8,919,181 | B2 * | 12/2014 | Stack .................... G01F 1/8413 73/1.16 |
| 2009/0272173 | A1 * | 11/2009 | McAnally ............ G01F 1/8413 73/1.16 |
| 2011/0023622 | A1 | 2/2011 | Lewinter et al. |

FOREIGN PATENT DOCUMENTS

| JP | 58-153121 A | 9/1983 |
|---|---|---|
| JP | 11-125552 A | 5/1999 |
| WO | 0118501 A1 | 3/2001 |
| WO | 2011009684 A1 | 1/2011 |

* cited by examiner

*Primary Examiner* — Jewel V Thompson
(74) *Attorney, Agent, or Firm* — The Ollila Law Group LLC

(57) ABSTRACT

A Coriolis flowmeter (205) is provided. The Coriolis flowmeter (205) includes a flowmeter assembly (206) including one or more flowtubes (210), a driver (220) coupled to and configured to vibrate the flowmeter assembly (206), two or more pickoff sensors (230, 231) coupled to and configured to generate two or more vibration signals from the flowmeter assembly (206), and meter electronics (20) coupled to the driver (220) and the two or more pickoff sensors (230, 231), with the meter electronics (20) configured to provide a drive signal to the driver (220) and receive the resulting two or more vibration signals from the two or more pickoff sensors (230, 231), wherein the two or more pickoff sensors (230, 231) are affixed at two or more corresponding pickoff sensor locations that maximize a Coriolis vibration mode of the Coriolis flowmeter (205).

12 Claims, 9 Drawing Sheets

FIRST BEND MODE

FIRST TWIST MODE

SECOND BEND MODE

SECOND TWIST MODE

CORIOLIS FLOWMETER AND METHOD WITH IMPROVED METER ZERO

BACKGROUND OF THE INVENTION

1. Field of the Invention

The present invention relates to a meter zero term of a Coriolis flowmeter, and more particularly, to an improved meter zero term.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes.

In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Two transducers (or pickoff sensors) are typically employed in order to measure a vibrational response of the flow conduit or conduits, and are typically located at positions upstream and downstream of the actuator. Mass flow rate may be determined by measuring time delay or phase differences between motions at the spaced-apart transducer locations, wherein the time delay or phase difference are caused by Coriolis forces in the flowing material. The Coriolis forces are generated by the directional change in the moving fluid due to the tube vibrations. These Coriolis forces are exerted on the sensor tube and produce perturbations in the vibrational motion. These perturbations will cause one end of a flowtube to lead and the other end to lag, creating a phase delay in the leading and lagging vibration sensor signals.

The pickoff sensors are connected to meter electronics (or other instrumentation) that receives the signals from the pickoff sensors and processes the signals in order to derive a mass flow rate measurement, among other things. To generate a mass flow rate measurement, the meter electronics can convert the measured phase delay into a time delay using the driving frequency of the vibration. The mass flow rate passing through the flow tubes is directly proportional to this time delay ($\Delta t$), as given by:

$$\text{mass flow rate} = FCF \times \Delta t \quad (1)$$

The (FCF) term is a flow calibration factor that takes into account various meter characteristics such as meter stiffness, ambient temperature, and meter construction and geometry, for example. However, in actual operation at a no flow condition, the time delay ($\Delta t$) may comprise a non-zero value and must be compensated for in the equation to accurately measure flows. Consequently, the mass flow rate may be better represented as:

$$\text{mass flow rate} = FCF \times (\Delta t - \Delta t_z) \quad (2)$$

The ($\Delta t_z$) term is a time delay correction value at a no-flow condition, also called a meter zero term. The meter zero term ($\Delta t_z$) may generate a no-flow vibrational phase shift due to positional, mass, and/or damping asymmetries between the driver and the pickoff sensor or sensors. The meter zero term ($\Delta t_z$) may also exist due to modal interactions of a pickoff sensor with the driving mode of the flowtube or tubes. The meter zero term ($\Delta t_z$) may exist due to pickoff sensor and driver design. The meter zero term ($\Delta t_z$) may exist due to environmental temperature and changes in the temperature.

It is well known in the art that the meter zero term ($\Delta t_z$) and the stability of the meter zero term ($\Delta t_z$) is greatly affected by geometric asymmetries of the flowtubes and/or the flowmeter assembly as a whole, by coupling between vibrational modes, by damping, and by the meter mounting characteristics and other environmental conditions.

These factors not only contribute to the magnitude of the meter zero term ($\Delta t_z$), but may also cause instability in the meter zero term ($\Delta t_z$) over time. This in turn affects the accuracy of the flow meter, especially at higher turn down. Meter turn down comprises a band of low flow rates just above a zero flow where the measurement signal cannot be distinguished from noise, i.e., flows too low to be accurately measured.

For these reasons, it is desired to keep the meter zero term ($\Delta t_z$) as small as possible. A large meter zero term ($\Delta t_z$) may present problems in a vibratory flowmeter. A meter zero term ($\Delta t_z$) of large magnitude may be more unstable than a meter zero term ($\Delta t_z$) of small magnitude. A meter zero term ($\Delta t_z$) of large magnitude may require more frequent re-zeroing operations.

A re-zeroing operation will require taking the vibratory flowmeter out of operation. The re-zeroing operation may require manual and time-consuming diagnostics/adjustments by a technician. For example, the user of the flowmeter is typically required to re-zero the flowmeter when the temperature changes by more than 20 degrees Centigrade.

Although the temperature effect on the meter zero term ($\Delta t_z$) is compensated for in the factory calibration process, the meter zero term ($\Delta t_z$) is typically non-adjustable. The stability of the meter zero term ($\Delta t_z$) is not capable of being adjusted or compensated.

ASPECTS OF THE INVENTION

In one aspect of the invention, a Coriolis flowmeter comprises:
  a flowmeter assembly including one or more flowtubes;
  a driver coupled to and configured to vibrate the flowmeter assembly;
  two or more pickoff sensors coupled to and configured to generate two or more vibration signals from the flowmeter assembly; and
  meter electronics coupled to the driver and the two or more pickoff sensors, with the meter electronics configured to provide a drive signal to the driver and receive the resulting two or more vibration signals from the two or more pickoff sensors;
  wherein in the two or more pickoff sensors are affixed at two or more corresponding pickoff sensor locations that maximize a Coriolis vibration mode of the Coriolis flowmeter.

Preferably, the two or more pickoff sensor locations increase a meter zero stability at a no-flow condition.

Preferably, the two or more pickoff sensor locations are minimally affected by a mounting condition of the Coriolis flowmeter.

Preferably, determining the two or more pickoff sensor locations comprises determining the two or more pickoff sensor locations that generate a substantially maximum Coriolis vibration mode response according to a modal analysis.

Preferably, the modal analysis comprises determining node locations for each vibration mode and determining a vibrational contribution to the Coriolis vibration mode by each vibration mode.

Preferably, the Coriolis flowmeter comprises a low-flow Coriolis flowmeter.

In one aspect of the invention, a method of forming a Coriolis flowmeter comprises:

performing modal analysis on a flowmeter assembly of the Coriolis flowmeter;

determining two or more pickoff sensor locations that maximize a Coriolis vibration mode of the Coriolis flowmeter in the two or more vibration signals; and affixing two or more corresponding pickoff sensors at the two or more pickoff sensor locations.

Preferably, the two or more pickoff sensor locations increase a meter zero stability at a no-flow condition.

Preferably, the two or more pickoff sensor locations are minimally affected by a mounting condition of the Coriolis flowmeter.

Preferably, determining the two or more pickoff sensor locations comprises determining the two or more pickoff sensor locations that generate a substantially maximum Coriolis vibration mode response according to the modal analysis.

Preferably, the modal analysis comprises determining node locations for each vibration mode and determining a vibrational contribution to the Coriolis vibration mode by each vibration mode.

Preferably, the Coriolis flowmeter comprises a low-flow Coriolis flowmeter.

DESCRIPTION OF THE DRAWINGS

The same reference number represents the same element on all drawings. The drawings are not necessarily to scale.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
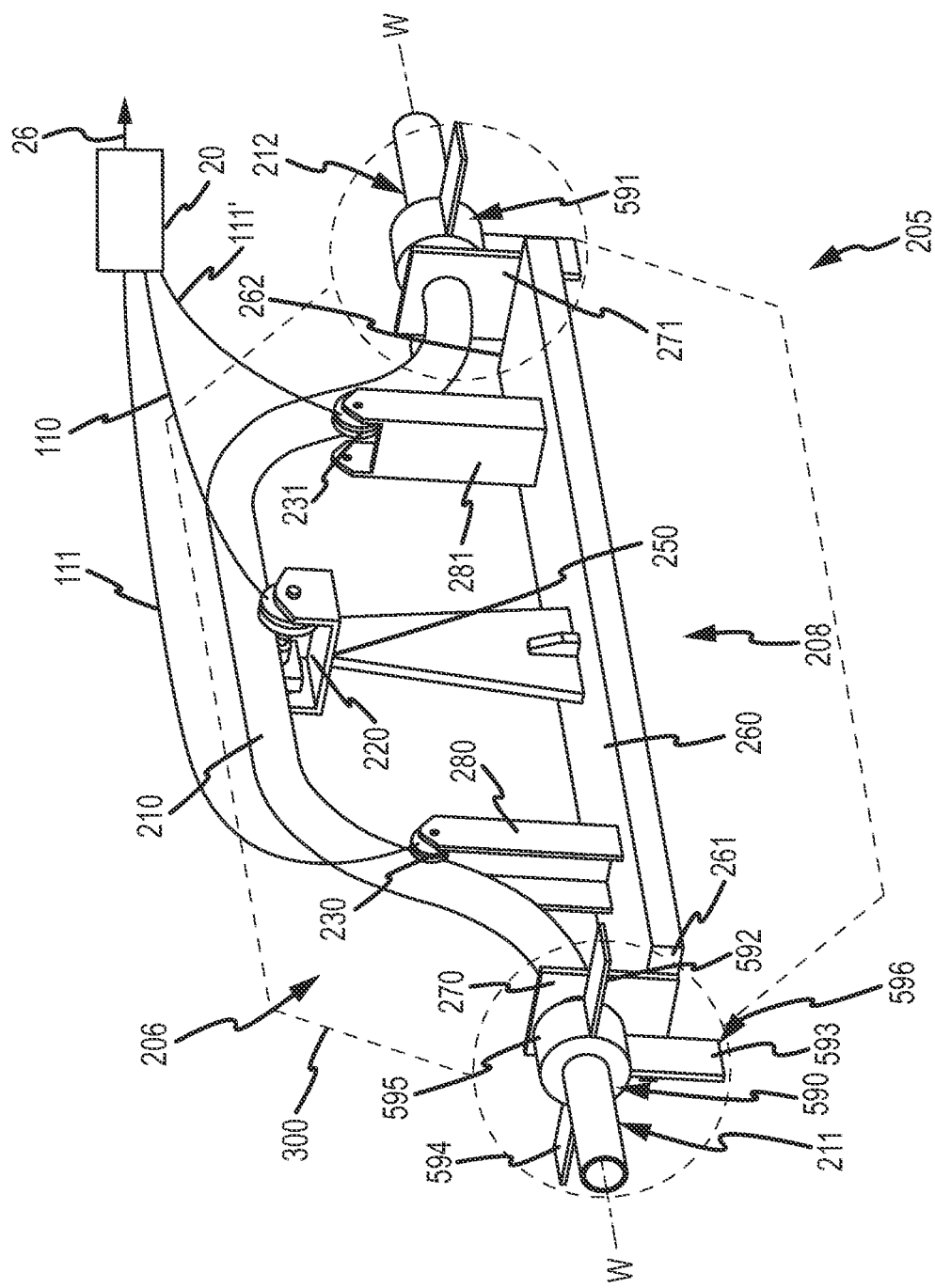
FIG. 1 shows a single curved tube Coriolis flowmeter according to the invention.

FIG. 1 shows a Coriolis flowmeter 205 according to the invention. The Coriolis flowmeter 205 according to any of the embodiments of the invention has an improved meter zero term. The Coriolis flowmeter 205 according to any of the embodiments of the invention has an improved meter zero term wherein the meter zero has an improved stability.

The Coriolis flowmeter 205 in the embodiment shown may comprise a flowmeter assembly 206 including a single curved flowtube 210, a balance structure 208, and a meter electronics 20. The meter electronics 20 is coupled to the flowmeter assembly 206 via the leads 110, 111, and 111' to measure a characteristic of a flowing substance, such as, for example, density, mass flow rate, volume flow rate, totalized mass flow, temperature, and other information. The meter electronics 20 can transmit the information to a user or other processor over a communication path 26. The communication path 26 provides an input and an output means that allows the meter electronics 20 to interface with an operator or with other electronic systems. The description of FIG. 1 is provided merely as an example of the operation of a Coriolis flowmeter and is not intended to limit the teaching of the present invention.

It should be apparent to those skilled in the art that the Coriolis flowmeter 205 can comprise any manner of vibratory flowmeter, regardless of the number of drivers, pickoff sensors, flow conduits, or the operating mode of vibration. It should be understood that the Coriolis flowmeter 205 can have any geometry, including straight flowtubes, slightly curved flowtubes, U-shaped flowtubes, delta shaped flowtubes, or any other shape of flow tube path. In some embodiments, the Coriolis flowmeter 205 may be operated as a Coriolis mass flowmeter. In addition, it should be recognized that the Coriolis flowmeter 205 may alternatively be operated as a vibratory densitometer.

The flowmeter assembly 206 includes a flowtube 210 that defines a flow path for receiving a flowing substance. The flowtube 210 may be bent, as shown, or may be provided with any other shape, such as a straight configuration or an irregular configuration. Additional flowmeter shapes and/or configurations can be used and are within the scope of the description and claims.

When the flowmeter assembly 206 is inserted into a pipeline system which carries the flowing substance, the substance enters the flowmeter assembly 206 through an inlet flange (not shown), then it flows through the flowtube 210, where a characteristic of the flowing substance is measured. Following this, the flowing substance exits the flowtube 210 and passes through an outlet flange (not shown). Those of ordinary skill in the art appreciate that the flowtube 210 can be connected to the flanges via suitable devices and/or structures. In the embodiment shown, the flowtube 210 is provided with end portions 211 and 212 that extend generally from connectors 270 and 271 and connect to the flanges at their outer extremities.

The flow fluid can comprise a liquid. The flow fluid can comprise a gas. The flow fluid can comprise a multi-phase fluid, such as a liquid including entrained gases and/or entrained solids.

The flowmeter assembly 206 of the present example includes at least one driver 220. The driver 220 may comprise one of many well-known arrangements, including for example, and not limitation piezoelectric elements, capacitive elements, or an electromagnetic coil/magnet arrangement. The driver 220, in the embodiment shown, includes a first portion connected to a driven member 250 of the balance structure 208 and a second portion connected to the flowtube 210. The first and second portions may correspond to a drive coil and a drive magnet, for example. In the present embodiment, the driver 220 preferably moves the driven member 250 and the flowtube 210 in phase opposition. In a dual flowtube embodiment, the driver 220 may vibrate the two flowtubes in opposition.

The driven member 250 and the flowtube 210 are preferably driven about a bending axis W, which may be defined in part by the connectors 270 and 271. According to an embodiment of the invention, the bending axis W corresponds to the inlet-outlet tube axis. The driven member 250 bends from the base 260. One skilled in the art will recognize that the meter can be driven in other modes, or even in multiple modes simultaneously. The pickoff sensor location optimization can be applied to any other modes, but is illustrated herein in the bending mode.

As shown in the figure, the flowmeter assembly 206 includes at least one pickoff. The embodiment shown is provided with a pair of pickoffs 230 and 231. According to one aspect of the present embodiment, the pickoffs 230 and 231 measure the motion of the flowtube 210. In the present embodiment, the pickoffs 230 and 231 include a first portion located on respective pickoff arms 280 and 281 and a second portion located on the flowtube 210. The pickoff(s) may comprise one of many well known arrangements, including for example and not limitation, piezoelectric elements, capacitance elements, or an electromagnetic coil/magnet arrangement. Therefore, like the driver 220, the first portion of the pickoff may comprise a pickoff coil while the second portion of the pickoff may comprise a pickoff magnet. Those of ordinary skill in the art will appreciate that the motion of the flowtube 210 is related to certain characteristics of the flowing substance, for example, the mass flow rate or density of the flowing substance through the flowtube 210.

Those of ordinary skill in the art will appreciate that the meter electronics 20 receives the pickoff signals from the pickoffs 230 and 231 and provides a drive signal to the driver 220. The meter electronics 20 can process the pickoff signals in order to measure a characteristic of a flowing substance, such as, for example, density, mass flow rate, volume flow rate, totalized mass flow, temperature, and other information. The meter electronics 20 processes the vibrational responses and typically determines a response frequency of the signals and/or a phase difference between the signals. The meter electronics 20 may also receive one or more other signals from, for example, one or more temperature sensors (not shown), and one or more pressure sensors (not shown), and use this information to measure a characteristic of a flowing substance. Other vibrational response characteristics and/or flow measurements are contemplated and are within the scope of the description and claims. Those of ordinary skill in the art will appreciate that the number and type of sensors will depend on the particular measured characteristic.

The flowmeter assembly 206 may also include a case 300 and case connects 590 and 591. The case connects 590 and 591 may include a first portion 595 connected to the flowtube 210 and a second portion 596 connected to the case 300. As shown, the case connects 590 and 591 are preferably the only structures supporting the conduit located between the flanges and the connectors 270 and 271.

The Coriolis flowmeter may include single or multiple flowtubes. The Coriolis flowmeter may include a flowtube(s) that is straight or curved. The Coriolis flowmeter may comprise any shape of flowtube(s) and may comprise any shape or shapes of any associated structures. The Coriolis flowmeter may be designed for use with any flow material, including liquids, gasses, or mixtures of liquids, gasses, and/or solids. The Coriolis flowmeter may be designed for high or low flow rates or for flow materials having any density.

In operation, the driver 220 induces vibration in the flowtube 210 and the two or more pickoff sensors 230 and 231 generate corresponding vibration signals. The vibration signals may characterize a plurality of superimposed vibrations measured at the two or more pickoff sensors 230 and 231. One or more of these vibrational modes will contribute to the Coriolis vibration mode.

In prior art dual tube Coriolis flowmeters, optimum pickoff sensor location has been attempted by positioning the pickoff sensors at the nodal points that define the second bend mode of vibration. An example of this is given in U.S. Pat. No. 5,301,557 to Cage et al. Positioning the pickoff sensors of a dual tube Coriolis flowmeter at the nodes defining the second bend mode nodes operates to decouple the Coriolis mode vibration (i.e., the leading and lagging aspect) from possible superposition of the Coriolis mode vibrations with the second bend mode. It is also a disadvantage of single tube Coriolis flowmeters that the Coriolis vibration mode couples with other vibration modes.

Figure 2:
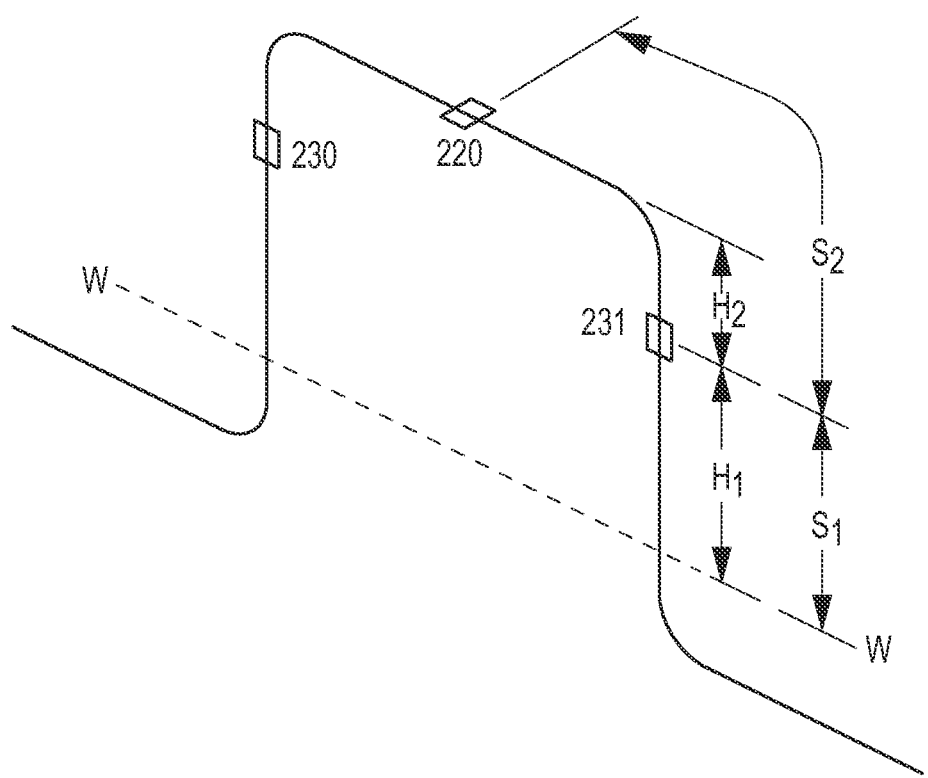
FIG. 2 shows a relative positioning of a driver and two or more pickoff sensors according to an embodiment of the invention.

FIG. 2 shows a relative positioning of the driver 220 and the two or more pickoff sensors 230 and 231 according to an embodiment of the invention. It can be seen from the figure that the two or more pickoff sensors 230 and 231 are located between the bending axis W and the driver 220. The two or more pickoff sensors 230 and 231 may be substantially equidistant from the driver 220 in some embodiments. However, it should be understood that the pickoff sensor locations determined according to the present description and claims are not limited to a symmetric or regular placement of the pickoff sensors.

The bending axis W may be located so as to create a vibratable span that will cyclically flex when perturbed by vibrational forces created by the driver 220. The bending axis W may be created by a brace bar(s), a balance beam(s), a casing, or other structure.

The distance of the two or more pickoff sensors 230 and 231 from the driver 220 (and/or from the bending axis W) may be measured in any manner. The distance may comprise a vertical height or heights, such as the height $H_1$ between the two or more pickoff sensors 230 and 231 and the bending axis W and the height $H_2$ between the two or more pickoff sensors 230 and 231 and the driver 220 in the figure. The distance may comprise an actual flowtube span, such as the spans $S_1$ and $S_2$ in the figure. The distance may comprise an angular displacement measurement (not shown). The distance may further be characterized as a ratio or percentage of the distance between the bending axis W and the two or more pickoff sensors 230 and 231 in relation to the distance between the two or more pickoff sensors 230 and 231 and the driver 220. It should be understood that other distance quantifications between the two or more pickoff sensors 230 and 231, the driver 220, and the bending axis W are contemplated and are within the scope of the description and claims.

The optimal pickoff sensor location may vary according to various factors. The optimal pickoff sensor location may be affected by the flowtube material, the flowtube wall thickness, the flowtube diameter, the flowtube cross-sectional shape, the overall flowtube shape (straight or curved in some manner), effective length of the vibratable portion, pickoff mass, and the presence/type of associated structure (i.e., brace bars, balance structures, flanges, casing, and so forth). The optimal pickoff sensor location may also vary according to pickoff sensor design parameters, e.g., the mass or inertia of the pickoff sensor.

FIGS. 3-6 show examples of various flowtube vibration or normal modes in a Coriolis flowmeter. The vibration modes are dependent on the sensor geometry, the flow tube shape and material, and the presence of associated structures. The vibration modes of FIGS. 3-6 will have analogues in every sensor geometry. It should be understood that the various vibration modes shown in FIGS. 3-6 are not necessarily to scale and may be exaggerated for the purpose of illustration. It should also be understood that the examples are simplified for clarity and in actual operation, the vibrational motion of a flowtube may comprise a superposition of multiple vibration modes.

Figure 3:
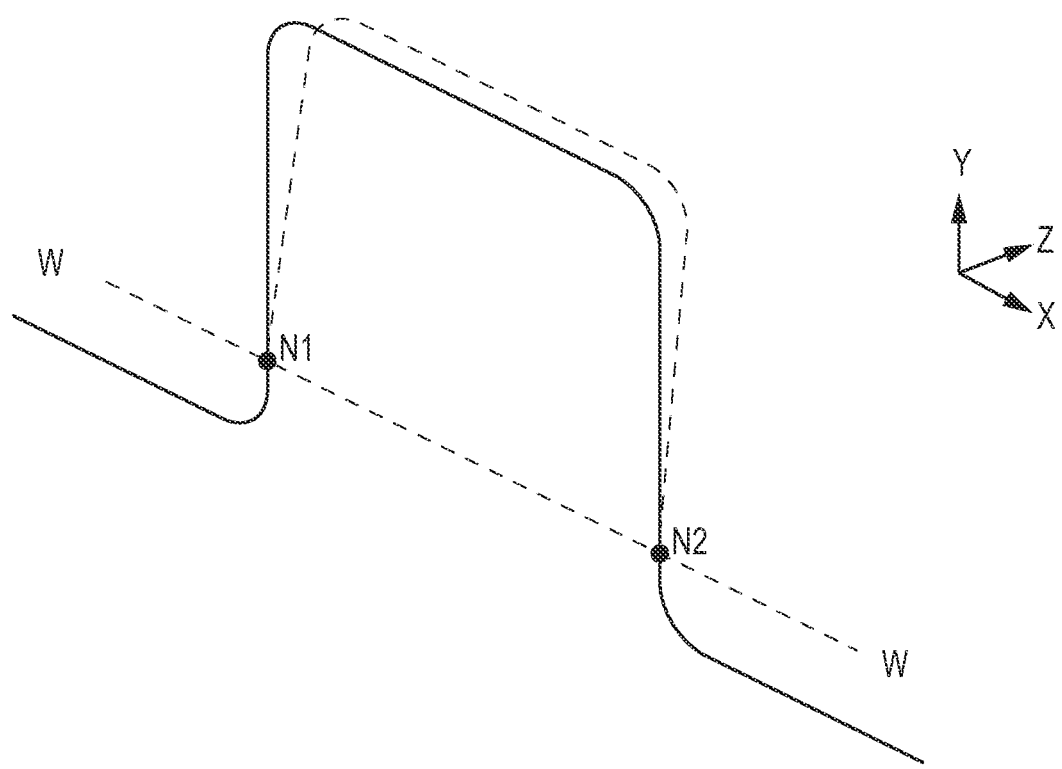
FIGS. 3-6 show examples of various flowtube vibration or normal modes in a Coriolis flowmeter.

FIG. 3 shows an example of a flowtube vibrating in a first bend mode. In the first bend mode, the top of the flowtube is displaced in a z-direction, wherein the portion of the flowtube above the bend axis W will subsequently flex and vibrate in the −z and +z directions. The two nodes N1 and N2 in the first bend mode are on the bend axis W.

Figure 4:
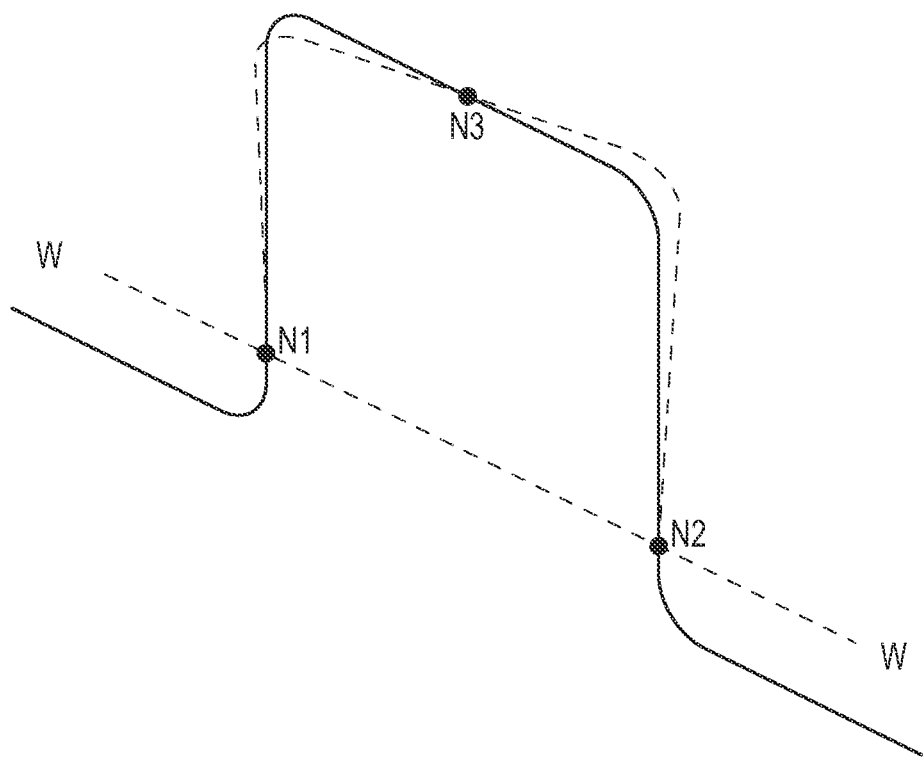

FIG. 4 shows an example of a flowtube vibrating in a first twist mode. In the first twist mode, the two ends of the top portion are displaced oppositely in the −z and +z directions. The first twist mode therefore has three nodes, two nodes N1 and N2 on the bend axis W and a node N3 in about the center of the top portion.

Figure 5:
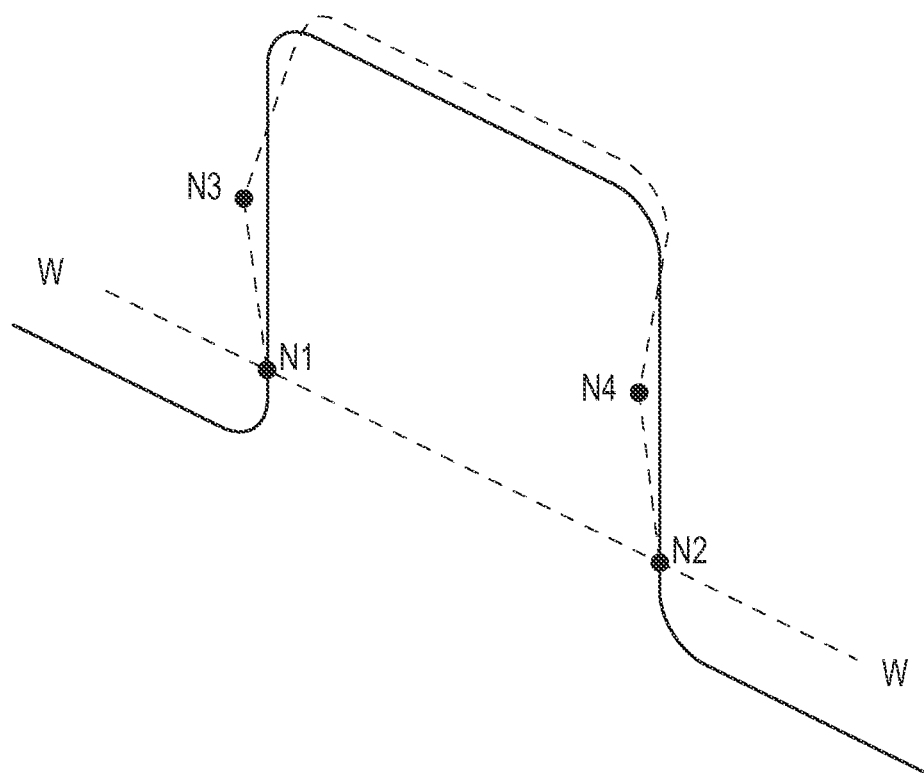

FIG. 5 shows an example of a flowtube vibrating in a second bend mode. In the second bend mode, the top of the flowtube is displaced in a z-direction, but the vertical legs of the flowtube also flex and a central portion of the vertical legs move in opposition to the top portion. The second bend mode therefore has four nodes, two nodes N1 and N2 on the bend axis W and two upper nodes N3 and N4 located between the bend axis W and the top portion of the flowtube.

Figure 6:
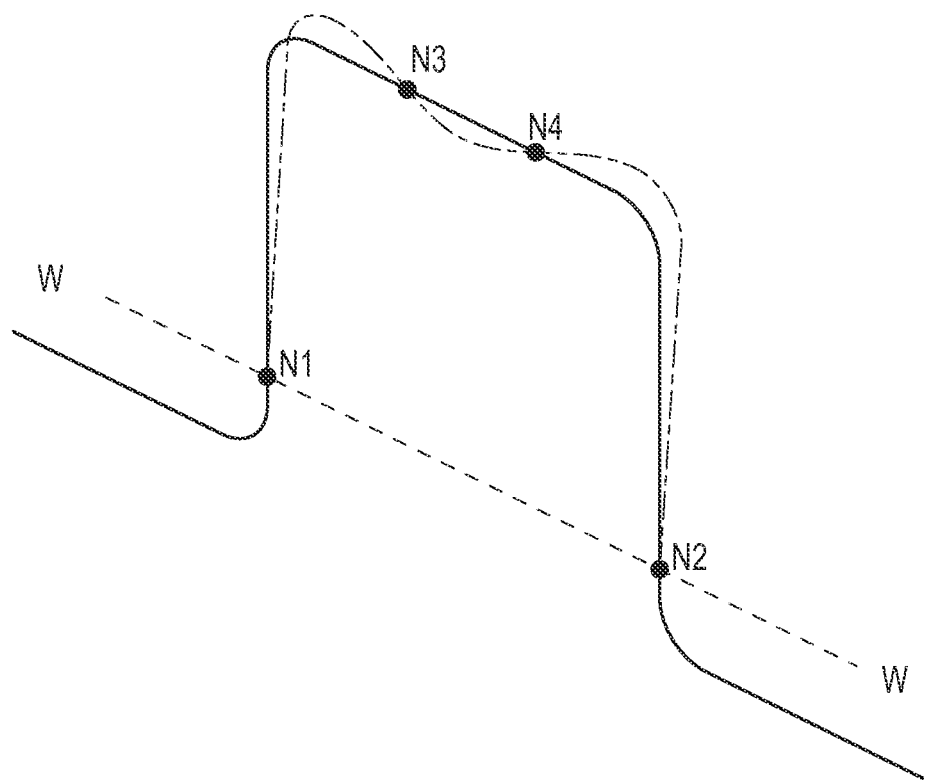

FIG. 6 shows an example of a flowtube vibrating in a second twist mode. In the second twist mode, the two ends of the top portion are displaced in a common z-direction, while a central portion of the top portion moves in opposition to the vertical legs and the two ends of the top portion. The second twist mode therefore has four nodes, two nodes N1 and N2 on the bend axis W and two upper nodes N3 and N4 on the top portion and located between the two ends of the top portion.

Figure 7:
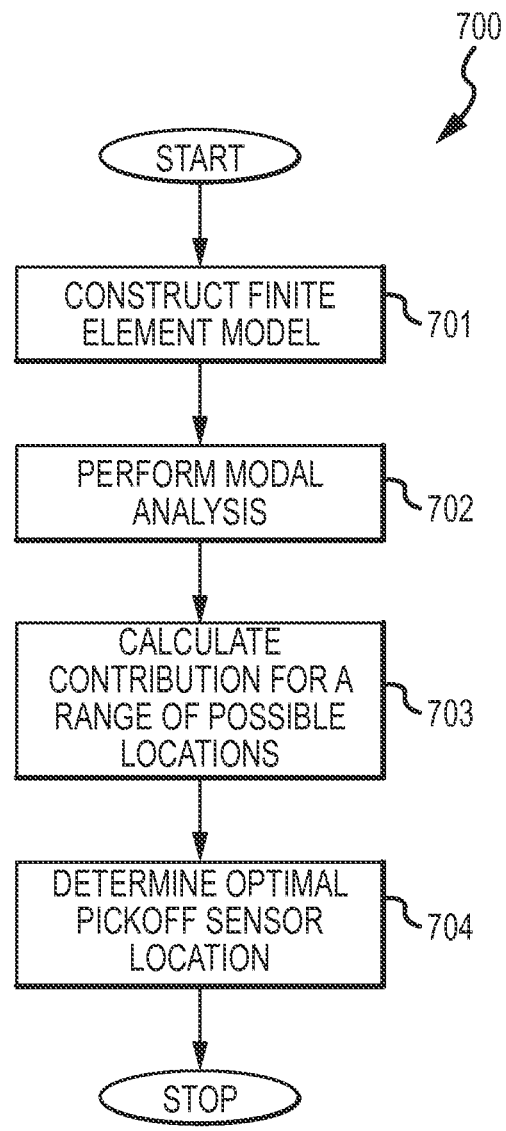
FIG. 7 is a flowchart of a method of forming a Coriolis flowmeter according to an embodiment of the invention.

FIG. 7 is a flowchart 700 of a method of forming a Coriolis flowmeter according to an embodiment of the invention. In step 701, a finite element (FE) model is constructed of the flowmeter assembly 206. The FE model can characterize the flowmeter assembly 206, including characterizing the number of flowtubes, the flowtube shape/geometry, and/or the flowtube construction, for example. The finite element modeled is prepared for a complex mode or forced response analysis with representative flow through the meter model.

In step 702, a modal analysis is performed for the Coriolis flowmeter. In the modal analysis, a modal domain complex mode or a modal domain frequency forced response solution is performed. Enough normal modes should be included in the complex mode solution to insure accurate results for the complex mode.

In step 703, the modal analysis calculates a Coriolis mode vibrational contribution to the total vibrational response of the Coriolis flowmeter. Further, the modal analysis may be configured to calculate a Coriolis mode vibrational contribution for a plurality of possible pickoff sensor locations on the flowtube or flowtubes. For example, a range of pickoff sensor locations on the flowtube or flowtubes may be selected for post processing. The time delay $\Delta t$ between the selected pickoff locations is calculated for each of the contributing modes.

In step 704, an optimal pickoff sensor location is determined from the Coriolis mode contributions for the range of analyzed pickoff sensor locations. This may include plotting the normalized time delay $\Delta t$ versus pickoff location, for example. The time delay $\Delta t$ is normalized by dividing by the total time delay $\Delta t$. The optimum pickoff location is chosen by selecting a location where the predominant contributor to the total time delay $\Delta t$ is from the desired Coriolis mode.

However, it should be understood that other methods may be employed for finding an optimal pickoff sensor location from the range of analyzed possible pickoff sensor locations. Further, the analysis may interpolate an optimal pickoff sensor position that is located between selected pickoff sensor positions in the set of analyzed pickoff sensor positions.

Figure 8:
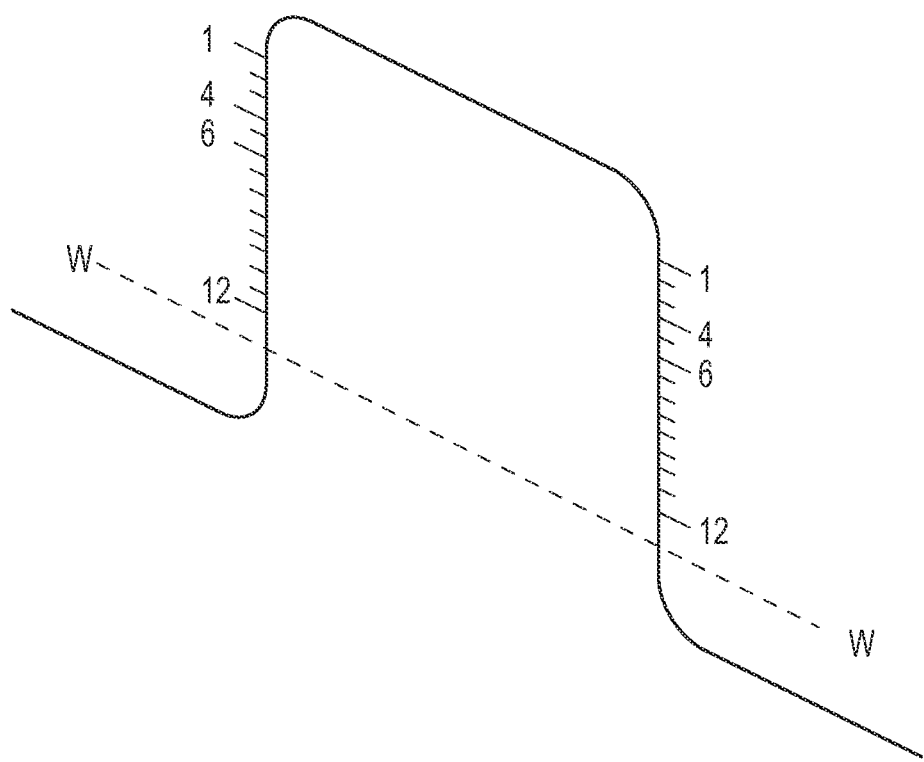
FIG. 8 is a representation of a single tube Coriolis flowmeter having a substantially rectangular tube shape wherein a series of possible pickoff locations are shown on the left side of the figure.

FIG. 8 is a representation of a single tube Coriolis flowmeter having a substantially rectangular tube shape wherein a series of possible pickoff locations 1-12 are shown on the left side of the figure. The series of possible pickoff locations 1-12 may be chosen in order to determine an optimal pickoff location. Usually, corresponding pickoff locations on the right leg of the tube will be used to compare symmetric PO locations. It should be understood that the drawing is not to scale and the test locations may be spaced differently than shown. The series of possible pickoff locations 1-12 may comprise even spacings or irregular spacings.

Figure 9:
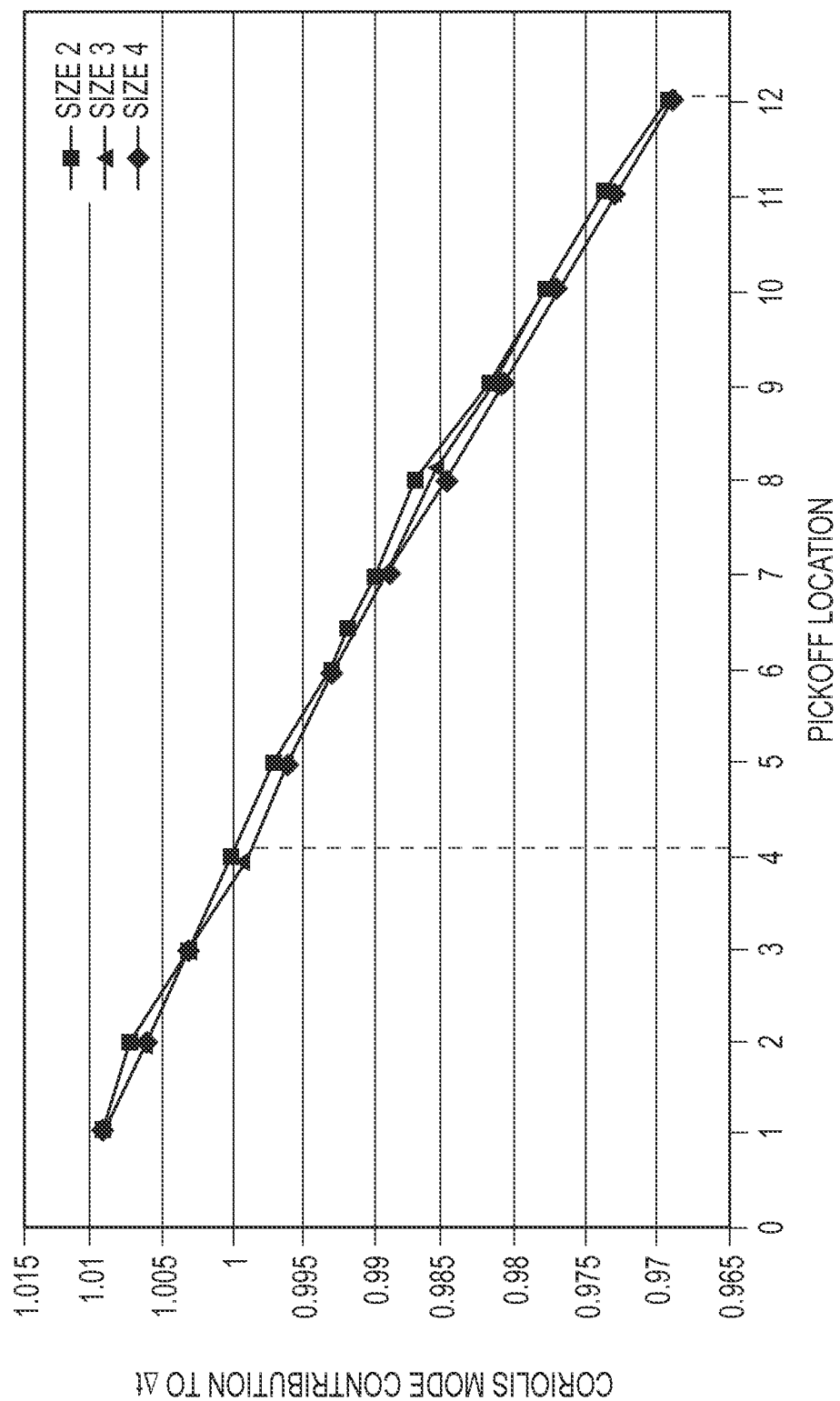
FIG. 9 is a graph of normalized Δt contribution versus the pickoff locations of FIG. 8.

FIG. 9 is a graph of normalized $\Delta t$ contribution from the Coriolis mode of vibration versus the pickoff locations 1-12 of FIG. 8. It can be seen from the graph that at location 4, the Coriolis vibration mode contributes one hundred percent of the measured time delay ($\Delta t$). This is the desired goal, to achieve a time delay measurement that is derived from only the Coriolis vibration mode and that does not include other vibration modes that are coupled with the Coriolis vibration mode.

It can be seen that as the pickoff sensor locations are moved from location 1 to location 12, i.e., away from the driver towards the base, the contribution of the Coriolis vibration mode to the total time delay $\Delta t$ decreases. It can be seen that location 4 is the ideal pickoff location for this Coriolis flowmeter (or Coriolis flowmeter model) because the entire time delay $\Delta t$ is due only to the Coriolis vibration mode, i.e., the contribution by the Coriolis vibration mode is unity.

The method advantageously reduces the magnitude of the meter zero term ($\Delta t_z$). The method advantageously increases the stability of the meter zero term ($\Delta t_z$). The method does this by correlating pickoff position on a flowtube (or flowtubes) to the contribution of the pickoff position to the strength of measurement of the Coriolis mode. This correlation and the subsequent positioning of the pickoff sensors at locations that generate a maximum Coriolis mode measurement will result in an optimal (and maximum) time delay ($\Delta t$) measurement and a largest possible signal-to-noise (S/N) ratio. As a result, the accuracy and reliability of mass flow measurements will be improved.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A Coriolis flowmeter (205), comprising:
   a flowmeter assembly (206) including one or more flowtubes (210);
   a driver (220) coupled to and configured to vibrate the flowmeter assembly (206);
   two or more pickoff sensors (230, 231) coupled to and configured to generate two or more vibration signals from the flowmeter assembly (206); and
   meter electronics (20) coupled to the driver (220) and the two or more pickoff sensors (230, 231), with the meter electronics (20) configured to provide a drive signal to the driver (220) and receive the resulting two or more vibration signals from the two or more pickoff sensors (230, 231);
   wherein in the two or more pickoff sensors (230, 231) are affixed at two or more corresponding pickoff sensor locations that maximize a Coriolis vibration mode of the Coriolis flowmeter (205).

2. The Coriolis flowmeter (205) of claim 1, wherein the two or more pickoff sensor locations increase a meter zero stability at a no-flow condition.

3. The Coriolis flowmeter (205) of claim 1, wherein the two or more pickoff sensor locations are minimally affected by a mounting condition of the Coriolis flowmeter (205).

4. The Coriolis flowmeter (205) of claim 1, with determining the two or more pickoff sensor locations comprising determining the two or more pickoff sensor locations that generate a substantially maximum Coriolis vibration mode response according to a modal analysis.

5. The Coriolis flowmeter (205) of claim 1, with the modal analysis comprising:
   determining node locations for each vibration mode; and
   determining a vibrational contribution to the Coriolis vibration mode by each vibration mode.

6. The Coriolis flowmeter (205) of claim 1, wherein the Coriolis flowmeter (205) comprises a low-flow Coriolis flowmeter (205).

7. A method of forming a Coriolis flowmeter (205), the method comprising:
   performing modal analysis on a flowmeter assembly (206) of the Coriolis flowmeter (205);
   determining two or more pickoff sensor locations that maximize a Coriolis vibration mode of the Coriolis flowmeter (205) in the two or more vibration signals; and
   affixing two or more corresponding pickoff sensors (230, 231) at the two or more pickoff sensor locations.

8. The method of claim 7, wherein the two or more pickoff sensor locations increase a meter zero stability at a no-flow condition.

9. The method of claim 7, wherein the two or more pickoff sensor locations are minimally affected by a mounting condition of the Coriolis flowmeter (205).

10. The method of claim 7, with determining the two or more pickoff sensor locations comprising determining the two or more pickoff sensor locations that generate a substantially maximum Coriolis vibration mode response according to the modal analysis.

11. The method of claim 7, with the modal analysis comprising:
    determining node locations for each vibration mode; and
    determining a vibrational contribution to the Coriolis vibration mode by each vibration mode.

12. The method of claim 7, wherein the Coriolis flowmeter (205) comprises a low-flow Coriolis flowmeter (205).

* * * * *